(12) United States Patent
Legzdins et al.

(10) Patent No.: US 9,774,153 B2
(45) Date of Patent: Sep. 26, 2017

(54) ELECTRICAL MODULES

(71) Applicant: Moduel AB, Stockholm (SE)

(72) Inventors: Lukass Legzdins, Stockholm (SE); Mats Arnesson, Stockholm (SE); Jonas Fritzdorf, Stockholm (SE); Kim Bergvall, Stockholm (SE)

(73) Assignee: Moduel AB, Stockholm (SE)

( * ) Notice: Subject to any disclaimer, the term of this patent is extended or adjusted under 35 U.S.C. 154(b) by 0 days.

(21) Appl. No.: 15/173,772

(22) Filed: Jun. 6, 2016

(65) Prior Publication Data

US 2016/0344147 A1 Nov. 24, 2016

Related U.S. Application Data

(63) Continuation of application No. PCT/SE2014/051450, filed on Dec. 4, 2014.

(51) Int. Cl.
*H01R 13/629* (2006.01)
*H01R 13/631* (2006.01)
(Continued)

(52) U.S. Cl.
CPC ....... *H01R 25/006* (2013.01); *H01R 13/6315* (2013.01); *H01R 24/78* (2013.01); *H02G 3/083* (2013.01); *H01R 2103/00* (2013.01)

(58) Field of Classification Search
CPC .. H01R 13/629; H01R 13/652; H01R 13/627; H01R 13/631; H01R 13/6275
(Continued)

(56) References Cited

U.S. PATENT DOCUMENTS 5,137,467 A * 8/1992 Arai .................... H01R 13/629
439/374
5,637,019 A * 6/1997 Crane, Jr. ............. H01R 13/64
439/374
(Continued)

FOREIGN PATENT DOCUMENTS

EP 1 389 816 A1 2/2004
EP 2 306 591 A1 4/2011
(Continued)

OTHER PUBLICATIONS

International Search Report for corresponding International Application No. PCT/SE2014/051450 dated Jan. 4, 2015.
(Continued)

*Primary Examiner* — Gary Paumen
(74) *Attorney, Agent, or Firm* — Renner, Otto, Boisselle & Sklar, LLP

(57) ABSTRACT

An electrical module comprises a first wall with a plug interface, wherein the plug interface includes a plurality of plug pins and a collar surrounding the plug pins, the collar having an envelope surface. A second wall is provided with a socket interface, wherein the socket interface includes a socket tip exhibiting a plurality of socket holes adapted to receive plug pins of an adjacent electrical module. The socket tip is surrounded by a socket cavity provided in the second wall and adapted to receive a collar of an adjacent electrical module. The plug interface is adapted to be connected to a socket interface of a corresponding electrical module and the socket interface is adapted to be connected to a plug interface of a corresponding electrical module. By providing a curved slope on the envelop surface of the collar, advantageous connection properties are achieved.

11 Claims, 4 Drawing Sheets

(51) Int. Cl.
*H01R 25/00* (2006.01)
*H02G 3/08* (2006.01)
*H01R 24/78* (2011.01)
*H01R 103/00* (2006.01)

(58) Field of Classification Search
USPC ........................................ 439/374, 106, 350
See application file for complete search history.

(56) References Cited

U.S. PATENT DOCUMENTS

| | | | | |
|---|---|---|---|---|
| 7,367,812 B2* | 5/2008 | Shih | ................... | H01R 13/6275 |
| | | | | 439/374 |
| 7,874,856 B1 | 1/2011 | Schriefer et al. | | |
| 7,896,683 B1* | 3/2011 | Ratzlaff | ............... | H01R 13/631 |
| | | | | 439/374 |
| 8,002,569 B2* | 8/2011 | Ikeda | ................... | H01H 50/048 |
| | | | | 439/374 |
| 8,512,069 B2* | 8/2013 | Kao | ..................... | H01R 13/506 |
| | | | | 439/106 |
| 8,998,637 B2* | 4/2015 | Neu | ......................... | H04R 5/00 |
| | | | | 439/374 |
| 9,011,171 B2* | 4/2015 | Feye-Hohmann | . | H01R 13/6273 |
| | | | | 439/350 |
| 2006/0079112 A1* | 4/2006 | Shuey | ................ | H01R 13/6315 |
| | | | | 439/374 |
| 2011/0201226 A1* | 8/2011 | Suzuki | ................. | H01R 12/716 |
| | | | | 439/374 |
| 2013/0273768 A1* | 10/2013 | Peng | .................... | H01R 13/629 |
| | | | | 439/374 |
| 2014/0106603 A1* | 4/2014 | Hiramatsu | ......... | H01R 13/6272 |
| | | | | 439/374 |
| 2014/0357114 A1* | 12/2014 | Pankau | .............. | H01R 13/6272 |
| | | | | 439/372 |
| 2015/0044901 A1* | 2/2015 | Doi | ........................ | H01R 12/65 |
| | | | | 439/374 |
| 2015/0263464 A1* | 9/2015 | Arichika | ............ | H01R 13/6271 |
| | | | | 439/374 |

FOREIGN PATENT DOCUMENTS

EP       2 388 866 A1    11/2011
WO    2012/104370 A1    8/2012

OTHER PUBLICATIONS

Written Opinion of the International Searching Authority for corresponding International Application No. PCT/SE2014/051450 dated Jan. 4, 2015.
International Preliminary Report on Patentability for corresponding International Application No. PCT/SE2014/051450 dated Jan. 7, 2016.

* cited by examiner

ELECTRICAL MODULES

TECHNICAL FIELD

The present invention relates generally to electrical modules.

BACKGROUND ART

Modular electrical plugs and sockets for professional use are known. However, standardized plugs and sockets are generally too big to make a space efficient modular solution for domestic use. For example, using a device connector socket/plug, such as the IEC C19/C20, would make the system become too big to be comparable with non-modular socket strips.

Using an industrial plug and socket, such as the standard, flat 3 pole connector, would also make the system too big and this type of connector is usually not suitable for transferring bending loads from one module to the next.

A industrial connector would also not be suitable either due its locking mechanism which requires a rotating movement to engage and for a modular electrical system it's most beneficial for the user to have an axial motion for connecting one module to the other.

Furthermore, the above mentioned connectors have no shutter protecting the current carrying connector sockets.

There are smaller connectors than the ones mentioned above but they are not intended for such high loads as 250 V and 16 A which is necessary for such a module system to be safe for domestic use.

SUMMARY OF INVENTION

An object of the present invention is to provide an electrical module with a space saving connection between two electrical modules with a high security level suited for a domestic application.

According to the invention there is provided an electrical module comprising a first wall with a plug interface, wherein the plug interface comprises a plurality of plug pins and a collar surrounding the plug pins, the collar having an envelope surface, a second wall with a socket interface, wherein the socket interface comprises a socket tip exhibiting a plurality of socket holes adapted to receive plug pins of an adjacent electrical module, and wherein the socket tip is surrounded by a socket cavity provided in the second wall and adapted to receive a collar of an adjacent electrical module, wherein the plug interface is adapted to be connected to a socket interface of a corresponding electrical module and the socket interface is adapted to be connected to a plug interface of a corresponding electrical module, the electrical module being characterized by a curved slope provided on the envelop surface of the collar.

Such a curved slope assists in avoiding a so-called jammed-drawer effect, i.e., to avoid jamming when the longitudinal axes of the two modules are not exactly parallel to each other.

In a preferred embodiment, the slope is provided with a steeper slope closer to the first wall, whereby the distance between the collar and the cavity wall of the socket module rapidly increases when the two modules move apart.

In a preferred embodiment, the collar is provided with a first locking means and the socket tip is provided with a second locking means, and wherein the first locking means is adapted to engage a second locking means of a mating plug connector adapted to engage a second locking means of a socket tip of a corresponding electrical module. give the user a tactile and audible feedback that the connector or module is fully inserted. These locking means increase the holding force between the plug and socket, both when used as a cable connector or as a connector between modules. This increases the tolerance for accidental disengagement when subjected to unintentional axial forces.

In a preferred embodiment, a collar step is provided at the innermost portion of the collar where the circumference of the collar is constant in the axial extension of the module and wherein a socket cavity step is provided in the socket cavity wall at the outermost portion of the socket cavity. When excessive force is applied to two adjacent modules, the plug step and wall step disengage and the shape of the slope on the collar and the wall of the socket cavity forces the modules to separate completely so there will not occur permanent damage on the parts.

In a preferred embodiment, the socket cavity step is shorter than the collar step, creating a small gap between two adjacent modules. Thereby, when they experience a bending force, for example when a pressure is applied from above on the joint between the two adjacent modules, the risk that the modules move apart slightly, i.e., they start to disengage, is decreased.

In a preferred embodiment, the plug pins comprise one centre plug pin, preferably for ground, and two phase plug pins for a respective electrical phase, and wherein the socket holes comprise one centre socket hole, preferably for ground, and two phase socket holes for a respective electrical phase. This provides a space efficient electrical interface between two adjacent modules.

In a preferred embodiment, a bottom of the module is provided with an opening aligned with the socket tip. This makes space for flexing that occurs during mating and disconnection of two modules. And also gives access to the socket tip during manufacturing.

In a preferred embodiment, an upper side of the electrical module is provided with an electrical device, preferably a standard electrical household socket, a switch, or a display. This gives easy access to the functionality of the module.

In a preferred embodiment, the first and second walls are provided on opposite sides of the electrical module. A row of modules with electrical devices of the same or different functionality can thereby be created.

BRIEF DESCRIPTION OF DRAWINGS

The invention is now described, by way of example, with reference to the accompanying drawings, in which.

DESCRIPTION OF EMBODIMENTS

In the following, a detailed description of an electrical module and connectors according to the invention will be given. The term "electrical module" should in this context be interpreted as any module exhibiting one or more electrical plug and/or socket connectors, mains outlets, switches etc. Also, spatial references such as "upper" or "lower" refers to the directions shown in the figures.

Figure 1:
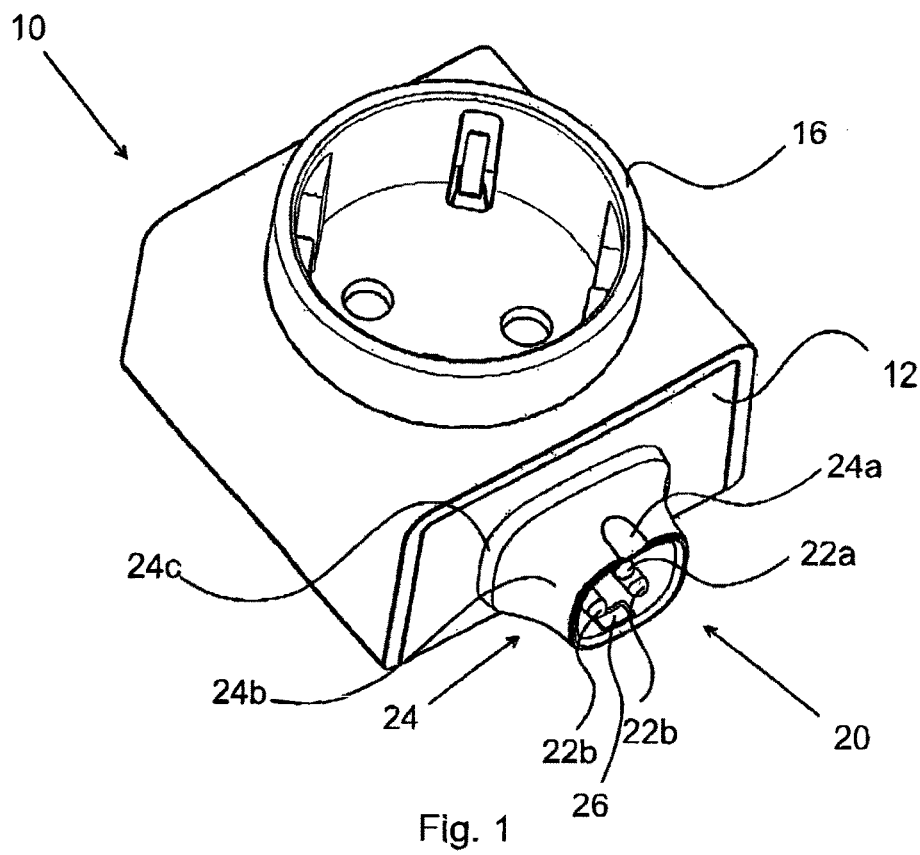
FIGS. 1 and 2 are perspective views of an embodiment of a socket module according to the present invention.
Figure 2:
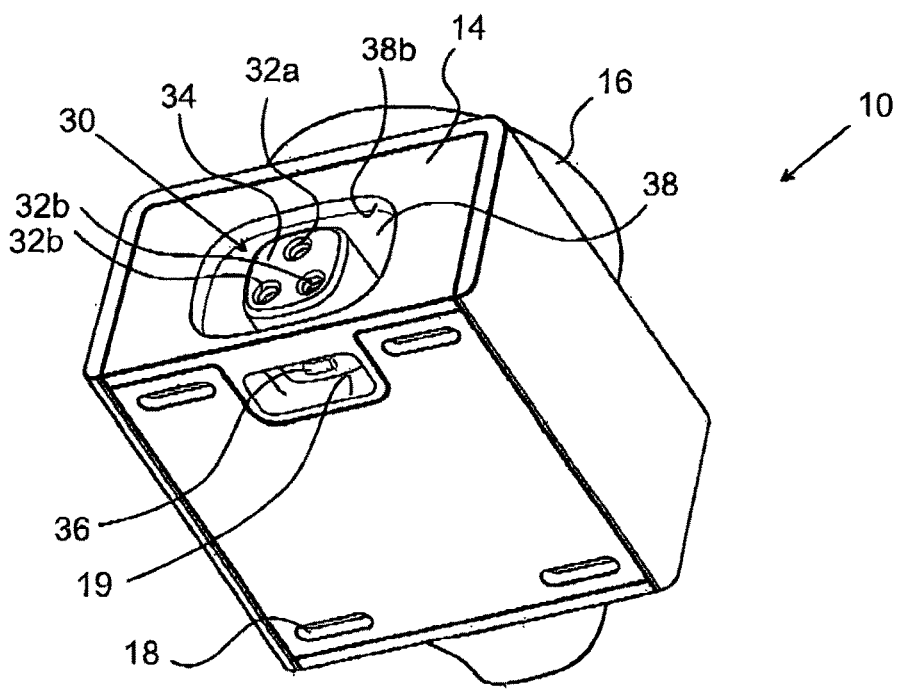

An electrical module, generally designated 10, is shown in FIGS. 1 and 2. The module 10 is essentially box shaped with a plug wall 12 and a socket wall 14. In the shown embodiment, the upper side of the module 10 is provided with an electrical device in the form of a standard electrical household socket 16, but it will be appreciated that the electrical device can be a switch, a display or any other device used in connection with electrical appliances. It is also envisaged that the electrical device may be an internal device for various functions, in which case the upper side of the module is a smooth surface.

With reference to FIG. 1, the plug wall 12 is provided with a plug interface, generally designated 20. The plug interface comprises three plug pins 22, one upper centre pin 22a for ground and two lower pins 22b for a respective electrical phase, arranged in accordance with the IEC 60320 standard and positioned with a mutual distance based on the minimum allowed creepage or gap distance specified in IEC 60320 assembly tolerances. In a preferred embodiment, the mutual distance of the two lower pins is about 3 millimeters and the distance between the upper centre pin and each of the two lower pins is about 4 millimeters. The plug pins 22a,b are surrounded by a collar 24, the function of which is both to provide protection for a user so that he or she avoids direct contact with the current conducting plug pins 22a, b and to provide an interconnection means for interconnection to an additional module, as will be described below. The collar 24 is provided with an orientation indicator 24a in the form of a recess in the mantle surface of the collar 24. The orientation indicator 24a facilitates correct orientation of a mating socket connector (not shown in FIGS. 1 and 2) by providing tactile feedback. The collar 24 is also provided with a locking means in the form of a locking indentation 26 adapted to receive a protrusion of a mating socket connector, as will be explained below.

Turning now to FIG. 2, the socket wall 14 is provided with a socket interface, generally designated 30. The socket interface comprises three socket holes 32a, b, each adapted to receive a respective of the plug pins 22a, b of the plug interface 20. The socket holes 32a, b are provided in a socket tip 34 having a size and shape adapted to be received in and surrounded by the collar 24 of the plug interface 20. The socket tip 34 is provided with a locking means in the form of a locking protrusion 36 adapted to be received in the indentation 26 of a mating plug connector. The locking indentation 26 and the locking protrusion 36 together give the user a tactile and audible feedback that the connector or module is fully inserted. They also increase the holding force between the plug and socket, both when used as a cable connector or as a connector between modules. This increases the tolerance for accidental disengagement when subjected to unintentional axial forces.

The socket tip 34 is surrounded by a socket cavity 38, having a cavity wall 38a with a step shaped outer portion 38b.

The bottom of the module 10 is provided with an attachment interface 18 facilitating attachment of the module 10 to a wall, a table surface or the like. In the shown embodiment, the attachment interface 18 comprises four holes adapted to receive attachment means such as hooks or the like. Finally, the bottom of the module 10 is also provided with an opening 19 aligned with the socket tip 34. This opening 19 allows access to the socket tip 34 during manufacturing and also gives space below the socket tip during interconnection and disconnection of two modules, thereby allowing some flexing of the collar 24 when passing the protrusion 36, as will be described below.

The interconnection and disconnection of two adjacent electrical modules 10', 10" will now be described in detail with reference to FIGS. 3-6.

Figure 3:
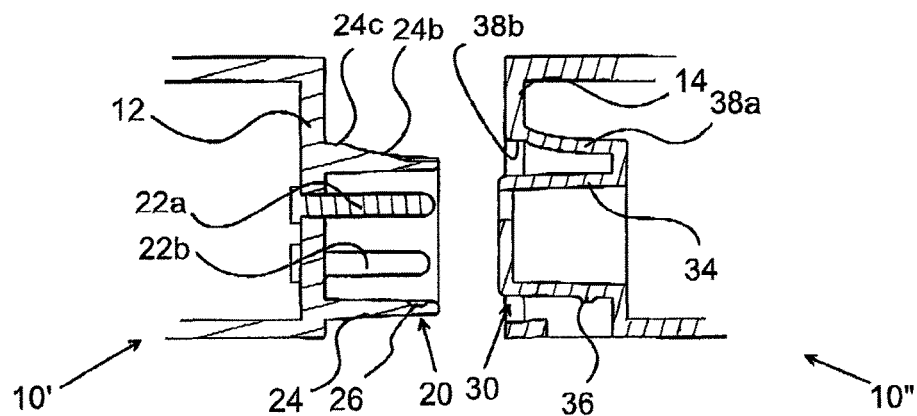
FIGS. 3-6 are sectional views of a plug interface module and a socket interface module showing different positions.

In FIG. 3 the modules 10', 10" are shown slightly separated before interconnection or mating of the plug interface 20 of the first module 10' and the socket interface 30 of the second module 10". Before interconnection, the plug pins 22a, b of the first module 10' are aligned with the socket holes of the second module 10" and the two modules are then simply pushed together to the position shown in FIG. 4. In this position, the locking protrusion 36 of the socket interface 30 engages the locking indentation 26 of the plug interface, increasing the strength of the interconnection between the two modules 10', 10" to prevent accidental disconnection of the two modules.

Figures 4, 5:
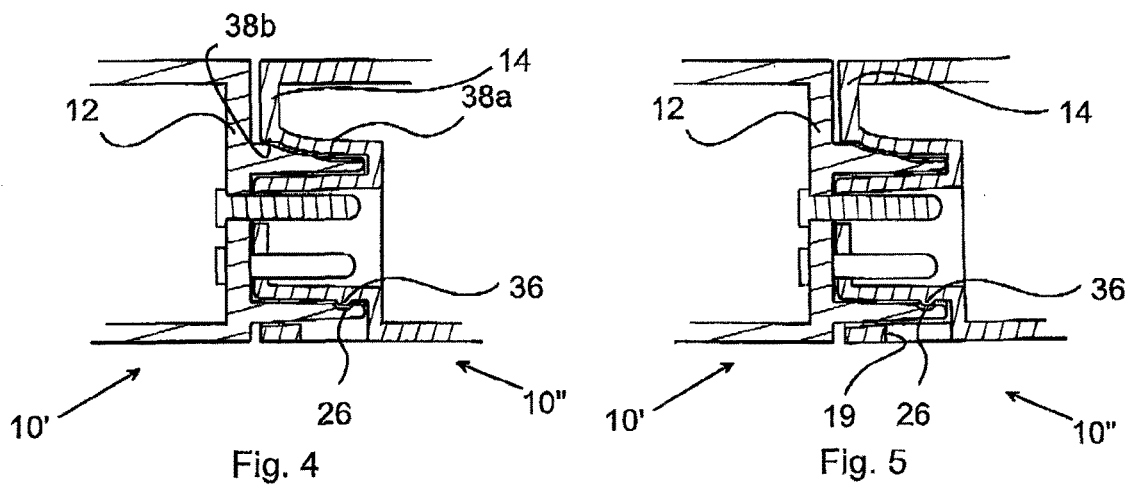

Intended disconnection of the two adjacent modules 10', 10" is achieved by simply pulling the two modules in opposite directions from the position shown in FIG. 4. The user will then experience a tactile feedback when the protrusion 36 of the socket tip 34 disengages the indentation 26 of the collar 24. The design of the collar 24 with the curved slope 24b assists in avoiding a so-called jammed-drawer effect, i.e., to avoid jamming when the longitudinal axes of the two modules 10', 10" are not exactly parallel to each other.

When two adjacent modules 10', 10" experience a bending force, for example when a pressure is applied from above on the joint between the two adjacent modules, there is a risk that the modules move apart slightly, they start to disengage.

To avoid this type of disconnection, the modules 10', 10" are made so that there is a small gap between the walls 12, 14 when the two modules interconnected. This gap delays the walls to push against each other which in turn prevents the plug interface and the socket interface from disengaging when there is a small force applied to them, for example when holding one module while removing a plug from the other module. During this delay the contact area between the surfaces of the plug interface 20 and the socket interface 30 increases and also the pressure between the surfaces increases which in turn increases the friction force holding the modules together. The relation between the clearances between the surfaces of the plug interface 20 and socket interface 30, and the distance from centre of rotation out to the corners of the wall 12 and 14 gives the amount of gap needed to avoid that the corners of the wall 12 and 14 meet, before the surfaces described above jam like in FIG. 5. In the presented geometry in FIG. 4 this needed gap is determined to be 0.4 mm, but could vary between 0.1 and 0.8 mm, more preferably between 0.2 and 0.6 mm.

In case the modules experience excessive forces, breaking of portions of the modules are avoided by the design of the collar 24. As seen in FIG. 3, for example, the collar 24 is shaped with a slope portion 24b on the upper portion thereof. In other words, the collar has a circumference that decreases with the distance from the base thereof, i.e., with the distance from the plug wall 12 of the module. At the innermost portion of the collar there is a collar step 24c wherein the circumference of the collar 24 is constant in the axial extension of the module. The wall 38a, 38b of the socket cavity 38 of the socket interface 30 has an almost complementary design, as best seen in FIG. 4, with a curved portion 38a and a socket cavity step 38b with constant radius in the axial extension of the module, wherein the socket cavity step 38b is provided at the outermost portion of the socket cavity 38.

The above mentioned gap is preferably achieved by making the step 38b of the socket cavity 38 shorter than the step 24c of the collar 24. Alternatively or additionally, this is achieved by doing the reverse and making the step 24c of the collar 24 longer than step 38b of the socket cavity 38 and thereby moving the whole plug interface 20 out from the plug wall 12, potentially in combination with the solution presented in FIG. 4. Yet another alternative is to extend axially the socket tip 34 outside the socket wall 14 while the mating plug interface's 20 bottom surface is still in line with plug wall 12 or to extend the collar 24 axially out from plug wall 12, or the reverse by shortening the cavity wall 38a, potentially in combination with other alternatives. Dimensioning the relation between the plug pins 22a and 22b so that they bottom out in the mating connector sockets, (not shown in the figures) is also a possibility. The bottoming out should occur before plug wall 12 and socket wall 14 touch each other.

The combination of a sloping or slanting portion and a step portion of the collar 24 in combination with the design of the socket cavity wall portions 38a, 38b has proven advantageous when transferring bending loads between the modules. For example, the shape of the collar 24 is designed so that it does not break under bending load and so that it can transfer load to an adjacent module and when exposed to high bending forces, the modules separate. This will be explained in more detail hereinafter.

A forced separation of the two modules 10', 10" starts from the position shown in FIG. 4. From this position, wherein the two modules are essentially coplanar, they are loaded as described above, see FIG. 5. This load situation could occur when two or more modules are supported only at each end, for example when one side is resting on the floor and the other end is resting on a threshold and then someone steps on the middle. As the force increases, the collar 24 starts to bend due to the bending forces caused by the mutual turning of the modules. When the turning has reached a certain level the steps 24c and 38b disengage.

Figure 6:
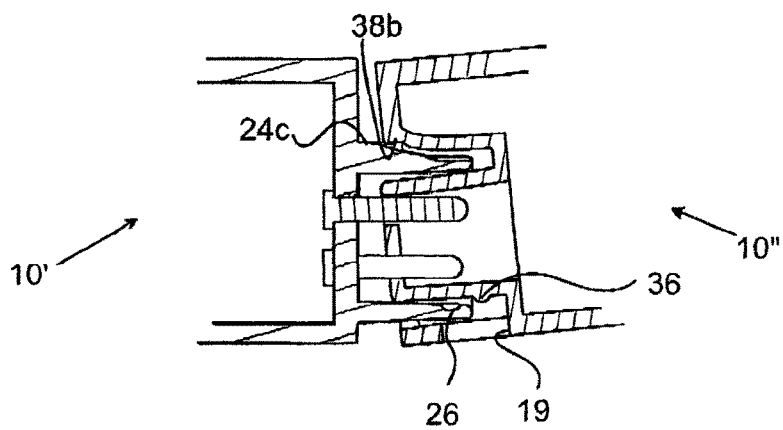

At this point the two modules 10', 10" separate, see FIG. 6. The advantageous effect of separation is facilitated by the fact that the slope 24b is curved, with a steeper slope closer to the plug wall 12, whereby the distance between the collar 24 and the cavity wall 38a of the socket module 10" rapidly increases when the two modules 10', 10" move apart.

Thus, when excessive force is applied to the two modules 10', 10" the plug step 24c and wall step 38b disengage and the shape of the slope 28b on the collar and the wall 38a of the socket cavity forces the modules to separate completely so there will not occur permanent damage on the parts.

Figure 7:
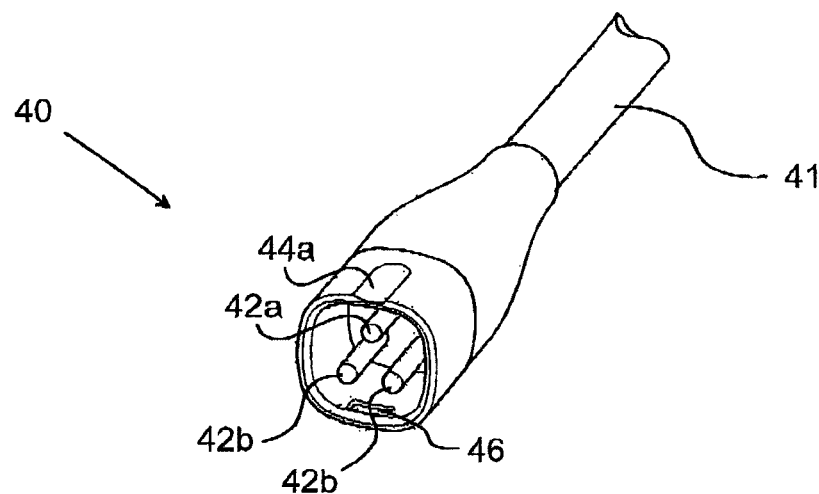
FIG. 7 is a diagrammatic perspective view of an embodiment of a cable connector plug according to the present invention.
Figure 8:
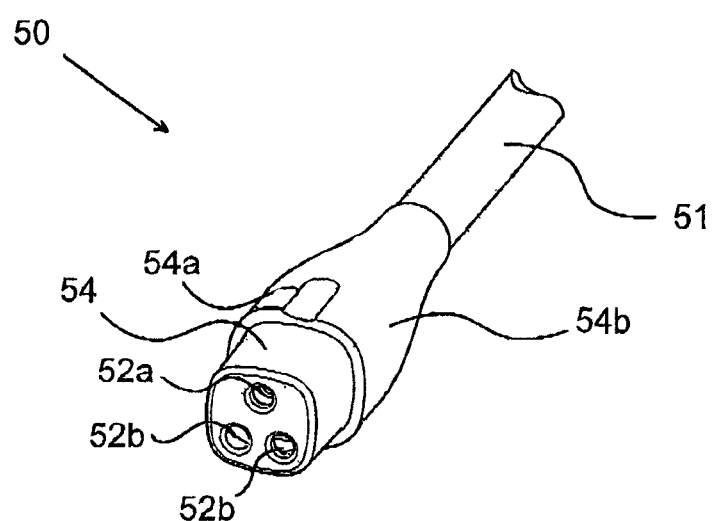
FIG. 8 is a diagrammatic perspective view of an embodiment of a cable connector socket according to the present invention.

Turning now to FIGS. 7 and 8, a plug interface in the form of a cable connector plug and a socket interface in the form of a cable connector socket, respectively, will be described. The cable connector plug, generally designated 40, is adapted to be attached to the end portion of a plug connector cable 41, and comprises three plug pins 42a,b arranged in the same way as the plug pins provided in the plug interface 20. The plug pins 42a,b are surrounded by a collar 44, the function of which is to provide protection for a user so that he or she avoids direct contact with the current conducting plug pins. The collar 44 is provided with an orientation indicator 44a in the form of a recess in the mantle surface of the collar 44. The orientation indicator 44a facilitates correct orientation of a mating socket connector shown in FIG. 8.

The collar 44 is also provided with a locking indentation 46 adapted to receive a protrusion of a mating socket connector.

Turning now to FIG. 8, a cable connector socket, generally designated 50, comprises three socket holes, one upper centre hole 52a for ground and two lower holes 52b for a respective electrical phase, each adapted to receive a respective of three plug pins of a plug interface. The socket holes 52a,b are provided in a socket tip 54 having a size and shape adapted to be received in the collar of a plug interface. The socket tip 54 is provided with a locking protrusion 56 (not shown in FIG. 8) adapted to be received in the indentation of a mating plug interface. The interior of the socket tip 54 is covered by a housing 54b which is provided with an orientation indicator in the form of a recess 54a.

Figure 9:
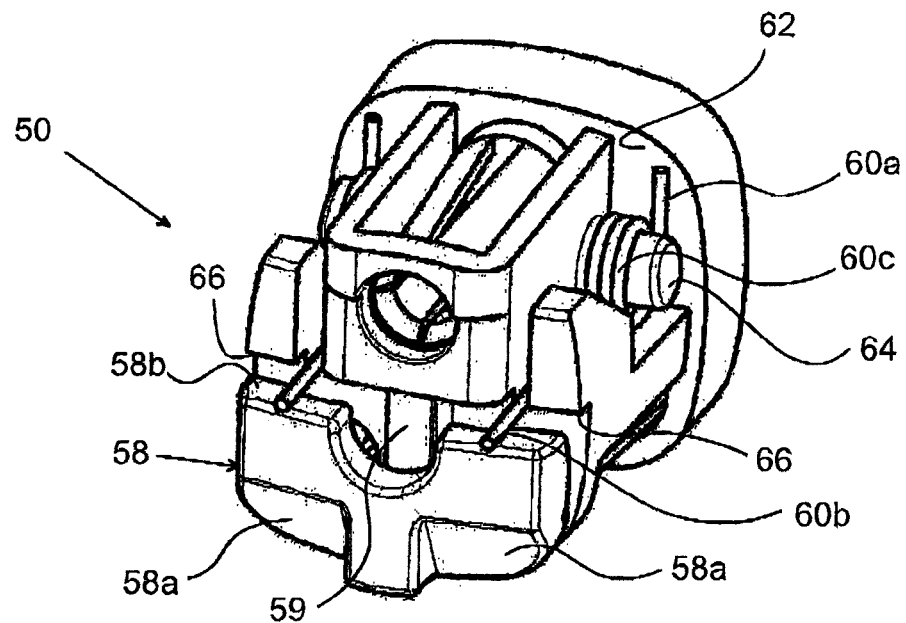
FIG. 9 is a diagrammatic perspective view of a socket inner body according to the invention with a shutter in a closed position.
Figure 10:
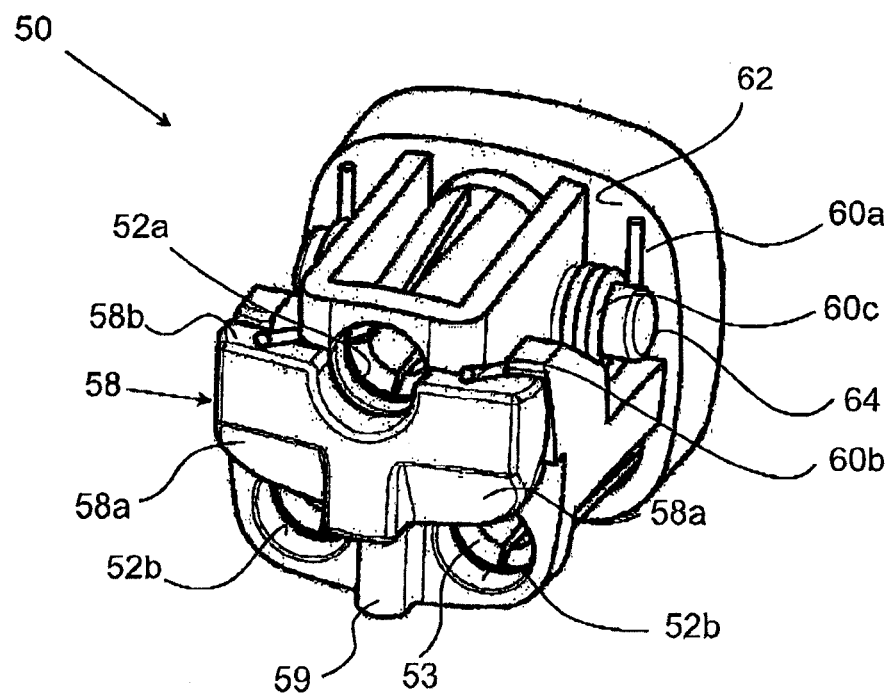
FIG. 10 is a diagrammatic perspective view of the socket inner body shown in FIG. 9 but with shutter in an open position.

The socket interface 50 of the cable connector socket will now be described in detail with reference to FIGS. 9 and 10, wherein FIG. 9 shows the socket interface without housing and with a shutter in a first end position while FIG. 10 is a similar view but with the shutter in a second end position.

The socket interface 50 is provided with three socket holes 52a,b, described above with reference to FIG. 8. These socket holes extend all through the socket interface 50 and each houses an electrically conducting, essentially tube-shaped lining 53 arranged to establish electrical connection with mating plug pins which have been inserted into a respective one of the socket holes. In front of the socket holes, a shutter 58 is provided linearly, in the present embodiment vertically movable between a first lower end position, in which it covers the two lowermost socket holes 52b, see FIG. 9, and a second upper end position, in which no socket holes are covered, see FIG. 10. The function of the shutter 58 is to prevent accidental insertion of objects into the socket holes 52a, b and into contact with the current-carrying linings 53 therein.

To effect movement from the lower end position to the upper end position, the front surface of the shutter is provided with two slanting or bevelled surfaces 58a, each adapted to cooperate with the tip of a respective plug pin during their insertion into the socket interface 50. More specifically, due to the slanting of the slanting surfaces 58a, during mating with a plug interface, the plug pins push the shutter 58 upward from its lower end position, shown in FIG. 9, to its upper end position, shown in FIG. 10. The shutter 58 is maintained in its upper end position as long as the plug and socket interfaces mate, i.e., as long as the plug pins extend into the lower socket holes 52b.

In order to ensure that the shutter 58 is in its lower end position when no plug pins are inserted into the socket holes, biasing means in the form of two shutter springs 60 are provided in the socket interface 50; one on either side of the upper socket hole 52a. Thus, the shutter springs 60 bias the shutter towards the first lower end position thereof. The shutter springs 60 are in the form of so called torsion springs, in this embodiment springs wherein two legs extend in different directions and the two legs are interconnected by a helical spring. In the shown embodiment, each shutter spring 60 has a first leg 60a abutting a vertical back wall 62 of the socket interface and a second leg 60b resting on the upper end portion 58b of the shutter 58. Each shutter spring 60 is journalled on or supported at its mid portion, i.e., a helical spring portion or torsion spring 60c, by a pin 64 extending horizontally in the socket interface transversely to the extension of the socket holes 52. With this configuration, the shutter 58 is biased downward by the shutter spring 60.

By providing two shutter springs 60, one on each side of the centre socket hole 52a, in combination with steps 66 and a rib 59 provided in the surface on which the shutter 58 slides, accidental upward movement of the shutter 58 is avoided in the case a force is applied on only one of the slanting surfaces 58*a* of the shutter. In this case, the shutter 58 is tilted either to the left or to the right due to the support of the vertical rib 59 and the upward movement thereof is prevented by one of the steps 66 engaging the upper end portion of the shutter.

Although the socket interface 50 of the cable connector socket has been described in detail, it will be appreciated that this description is applicable also to the design of the socket interface 30 of the electrical module 10.

Preferred embodiments of an electrical module and connectors have been described. It will be appreciated that these can be modified within the scope of the appended claims without departing from the inventive idea. Thus, although the described embodiments exhibit connectors with two phases and one ground, it will be appreciated that the invention is applicable also to ungrounded devices exhibiting just two plug pins and corresponding socket holes or other configurations. Also, although embodiments with two torsion springs biasing the shutter of the socket connector have been described, it will be realized that one single torsion spring may also be used.

A specific torsion spring arrangement has been described. It will be appreciated that this can be varied, for example by having the first leg abut a support different from the vertical back wall of the socket interface. Instead, the first leg of the torsion spring may rest on any other surface or be fixed, as long as it remain stationary while the second leg moves with the shutter.

The electrical module has been shown with the plug wall and the socket wall on opposite sides of the module. When interconnected, a plurality of electrical modules will form a row of modules. However, an electrical module according to the invention may also be provided with other configurations of plug walls and socket walls, such as a plug wall and socket wall on adjacent sides of the module or a plurality of plug walls and/or socket walls.

Although the locking means have been described as an indentation in the collar of the plug interface and a protrusion in the socket tip, it will be realised that the opposite configuration, i.e., with a protrusion on the collar of the plug interface and an indentation in the socket tip, is also possible.

We claim:

1. An electrical module comprising
a first wall with a plug interface, wherein the plug interface comprises a plurality of plug pins and a collar surrounding the plug pins, the collar having an outer envelope surface,
a second wall with a socket interface, wherein the socket interface comprises a socket tip exhibiting a plurality of socket holes having a receiving configuration corresponding to a configuration of the plurality of plug pins, and wherein the socket tip is surrounded by a socket cavity provided in the second wall and has a receiving configuration corresponding to a configuration of the collar surrounding the plug pins,
wherein the plug interface has a connection configuration corresponding to a connection configuration of the socket interface,
wherein a curved slope is provided on the envelope surface of the collar, the slope being provided with a steeper slope closer to the first wall.

2. The electrical module according to claim 1, wherein the slope is provided with a steeper slope closer to the first wall.

3. The electrical module according to claim 1, wherein the collar is provided with a first locking means and the socket tip is provided with a second locking means, and wherein the first locking means has an engagement configuration corresponding to an engagement configuration of the second locking means.

4. The electrical module according to claim 1, wherein a collar step is provided at the innermost portion of the collar where the circumference of the collar is constant in the axial extension of the module and wherein a socket cavity step is provided in the socket cavity wall at the outermost portion of the socket cavity.

5. The electrical module according to claim 4, wherein the socket cavity step is shorter than the collar step.

6. The electrical module according to claim 1, wherein the plug pins comprise one centre plug pin, and two phase plug pins for a respective electrical phase, and wherein the socket holes comprise one centre socket hole, and two phase socket holes for a respective electrical phase.

7. The electrical module according to claim 1, wherein a bottom of the module is provided with an opening aligned with the socket tip.

8. The electrical module according to claim 1, wherein an upper side of the electrical module is provided with an electrical device.

9. The electrical module according to claim 1, wherein the first and second walls are provided on opposite sides of the electrical module.

10. The electrical module according to claim 1, wherein the centre plug pin is for ground, and the centre socket hole is for ground.

11. The electrical module according to claim 8, wherein the electrical device is a standard electrical household socket, a switch, or a display.

* * * * *

UNITED STATES PATENT AND TRADEMARK OFFICE
CERTIFICATE OF CORRECTION

PATENT NO.         : 9,774,153 B2
APPLICATION NO.    : 15/173772
DATED              : September 26, 2017
INVENTOR(S)        : Legzdins et al.

Page 1 of 1

It is certified that error appears in the above-identified patent and that said Letters Patent is hereby corrected as shown below:

On the Title Page

Item [30], should read:
-- Dec. 5, 2013 (SE) ..................... 1300754-7 --.

Signed and Sealed this
Fourth Day of December, 2018

Andrei Iancu
*Director of the United States Patent and Trademark Office*